United States Patent
Chang et al.

(10) Patent No.: US 10,854,218 B2
(45) Date of Patent: Dec. 1, 2020

(54) MULTICHANNEL MICROPHONE-BASED REVERBERATION TIME ESTIMATION METHOD AND DEVICE WHICH USE DEEP NEURAL NETWORK

(71) Applicant: Industry-University Cooperation Foundation Hanyang University, Seoul (KR)

(72) Inventors: Joon-Hyuk Chang, Seoul (KR); Myung In Lee, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 16/469,938

(22) PCT Filed: Dec. 15, 2017

(86) PCT No.: PCT/KR2017/014857
§ 371 (c)(1),
(2) Date: Jun. 14, 2019

(87) PCT Pub. No.: WO2018/111038
PCT Pub. Date: Jun. 21, 2018

(65) Prior Publication Data
US 2020/0082843 A1 Mar. 12, 2020

(30) Foreign Application Priority Data
Dec. 15, 2016 (KR) .................. 10-2016-0171359

(51) Int. Cl.
*G10L 25/30* (2013.01)
*G01H 7/00* (2006.01)
(Continued)

(52) U.S. Cl.
CPC ............... *G10L 25/30* (2013.01); *G01H 7/00* (2013.01); *G06N 3/08* (2013.01); *G10L 25/06* (2013.01); *G10L 2021/02082* (2013.01)

(58) Field of Classification Search
CPC .......................... G10H 2250/111; G01H 7/00
See application file for complete search history.

(56) References Cited

FOREIGN PATENT DOCUMENTS

| KR | 10-2016-0015005 A | 2/2016 |
|---|---|---|
| KR | 10-2016-0073874 A | 6/2016 |

OTHER PUBLICATIONS

Yusuke Hioka et al., "Estimating Direct-to-Reverberant Ratio Mapped From Power Spectral Density Using Deep Neural Network," IEEE International Conference, Mar. 20-25, 2016, pp. 26-30 (8 pages).*

(Continued)

*Primary Examiner* — Kile O Blair
(74) *Attorney, Agent, or Firm* — Sughrue Mion, PLLC

(57) ABSTRACT

A multichannel microphone-based reverberation time estimation method and device which use a deep neural network (DNN) are disclosed. A multichannel microphone-based reverberation time estimation method using a DNN, according to one embodiment, comprises the steps of: receiving a voice signal through a multichannel microphone; deriving a feature vector including spatial information by using the inputted voice signal; and estimating the degree of reverberation by applying the feature vector to the DNN.

9 Claims, 7 Drawing Sheets

(51) Int. Cl.
  *G06N 3/08* (2006.01)
  *G10L 25/06* (2013.01)
  *G10L 21/0208* (2013.01)

(56) References Cited

OTHER PUBLICATIONS

J. Eaton, N. D. Gaubitch, P. A. Naylor: Noise-robust reverberation time estimation using spectral decay distributions with reduced computational cost. Proc. IEEE Int. Conf. Acoust., Speech, Signal Process. (ICASSP), 2013, Vancouver, BC, Canada.*
N. D. Gaubitch et al., "Performance Comparison of Algorithms for Blind Reverberation Time Estimation From Speech," International Workshop on Acoustic Signal Enhancement 2012, Sep. 4-6, 2012, pp. 1-4 (5 pages).
Myung In Lee et al., "Intelligent Estimation Technology of Acoustic Environmental Parameter," The Korean Institute of Communications and Information Sciences (KICS), Sep. 2016, pp. 30-34 (8 pages).
Myungin Lee et al., "Blind Estimation of Reverberation Time Using Deep Neural Network," 2016 5th IEEE International Conference on Network Infrastructure and Digital Content, Sep. 23-25, 2016, pp. 1-4 (6 pages).
International Search Report of PCT/KR2017/014857 dated Mar. 21, 2018.

* cited by examiner

MULTICHANNEL MICROPHONE-BASED REVERBERATION TIME ESTIMATION METHOD AND DEVICE WHICH USE DEEP NEURAL NETWORK

TECHNICAL FIELD

Example embodiments relate to a method and apparatus for multichannel microphone-based reverberation time estimation using a deep neural network (DNN). More particularly, the example embodiments relate to a method and apparatus for multichannel microphone-based reverberation time estimation using a DNN that may estimate a degree of reverberation by deriving a feature vector capable of including spatial information using a voice signal input through a multichannel microphone and then applying the feature vector to an artificial neural network.

RELATED ART

In general, in real-life acoustic environments, a signal originated from a point of speech propagates through a shortest distance and also generates a reverberation by going through a reflex path. Such reverberation significantly degrades the performance of a voice and acoustic signal processing process, for example, voice recognition, direction estimation, voice modeling, and location estimation. During this process, technology for quantitatively estimating a degree of reverberation is essential to adaptively enhance the performance by applying to an algorithm, for example, voice recognition, direction estimation, voice modeling, and location estimation.

Reverberation time estimation techniques according to the related art estimate a reverberation time by using a decay rate distribution as an input of a secondary polynomial regression based on an aspect that a physical feature of reverberation is observed to be related to a frequency modulation and the decay rate distribution.

A method of estimating reverberation depending on a single feature vector is not robust and needs to apply a different polygonal equation depending on an environment. Also, although modeling is performed using an experimentally highly related feature vector, the method may not readily apply to a real-life in which a variety of noise is present and has a degraded accuracy.

A method and apparatus for multichannel microphone-based reverberation time estimation using a discriminative training deep neural network (DNN) of a class-based acoustic model, and a speech recognition apparatus using the same are disclosed in Korean Laid-Open Publication No. 10-2016-0015005.

DETAILED DESCRIPTION

Subject

Example embodiments provide a method and apparatus for multichannel microphone-based reverberation time estimation using a deep neural network (DNN), and more particularly, provide technology for estimating a degree of reverberation by deriving a feature vector capable of including spatial information using a voice signal that is input through a multichannel microphone and then applying the feature vector to an artificial neural network, in a situation in which the spatial information is unknown.

Example embodiments also provide a method and apparatus for multichannel microphone-based reverberation time estimation using a DNN that may apply, to estimation, relative spatial information between input signals using a multichannel microphone and may estimate a degree of reverberation by modeling a nonlinear distribution of feature vectors capable of excellently representing a reverberation characteristic of space using a DNN, thereby achieving accuracy and a characteristic robust against noise.

Solution

According to an example embodiment, there is provided a method for multichannel microphone-based reverberation time estimation using a deep neural network (DNN), the method including receiving an input of a voice signal through a multichannel microphone; deriving a feature vector that includes spatial information using the input voice signal; and estimating a degree of reverberation by applying the feature vector to the DNN.

The receiving of the voice signal through the multichannel microphone may include estimating relative spatial information between voice signals input using the multichannel microphone.

The deriving of the feature vector that includes the spatial information using the input voice signal may include deriving a negative-side variance (NSV) by deriving time and frequency information from the input voice signal using a short-time Fourier transform (STFT) and by deriving distribution of envelopes for each frequency band based on the derived time and frequency information.

The deriving of the NSV may include deriving a log-energy envelope from a domain of the STFT; deriving a gradient from the log-energy envelope using a least squares linear fitting; and deriving an NSV for estimating a reverberation time having a negative gradient, excluding a reverberation time having a positive gradient.

The estimating of the degree of reverberation by applying the feature vector to the DNN may include estimating a reverberation time by using the derived NSV as an input of the DNN.

The deriving of the feature vector that includes the spatial information using the input voice signal may include deriving a cross-correlation function for estimating a direction of voice in the multichannel microphone by representing a correlation between two microphones in the input voice signal.

The estimating of the degree of reverberation by applying the feature vector to the DNN may include estimating a reverberation time by using the derived NSV as an input of the DNN, and estimating the reverberation time by using a value of the cross-correlation function that includes spatial information between microphones derived through the multichannel microphone as the input of the DNN.

The DNN may include three hidden layers, and each of the hidden layers may be configured to be finely adjusted through a pre-training process using a plurality of epochs.

According to another example embodiment, there is provided an apparatus for multichannel microphone-based reverberation time estimation using a DNN, the apparatus including an inputter configured to receive an input of a voice signal through a multichannel microphone; a feature vector extractor configured to derive a feature vector that includes spatial information using the input voice signal; and a reverberation estimator configured to estimate a degree of reverberation by applying the feature vector to the DNN.

The feature vector extractor may include an NSV deriver configured to derive an NSV by deriving time and frequency information from the input voice signal using an STFT and by deriving distribution of envelopes for each frequency band based on the derived time and frequency information.

The NSV deriver may be configured to derive a log-energy envelope from a domain of the STFT, to derive a gradient from the log-energy envelope using a least squares linear fitting, and to derive an NSV for estimating a reverberation having a negative gradient, excluding a reverberation time having a positive gradient.

The reverberation estimator may be configured to estimate a reverberation time by using the derived NSV as an input of the DNN.

The feature vector extractor may include a cross-correlation function deriver configured to derive a cross-correlation function for estimating a direction of voice in the multichannel microphone by representing a correlation between two microphones in the input voice signal.

The reverberation estimator may be configured to estimate a reverberation time by using the derived NSV as an input of the DNN, and to estimate a reverberation time by using a value of the cross-correlation function that includes spatial information between microphones derived through the multichannel microphone as the input of the DNN.

The DNN may include three hidden layers, and each of the hidden layers may be configured to be finely adjusted through a pre-training process using a plurality of epochs.

Effect

According to example embodiments, there may be provided a method and apparatus for multichannel microphone-based reverberation time estimation using a deep neural network (DNN) that may estimate a degree of reverberation by deriving a feature vector capable of including spatial information using a voice signal that is input through a multichannel microphone and then applying the feature vector to an artificial neural network, in a situation in which the spatial information is unknown.

According to example embodiments, there may be provided a method and apparatus for multichannel microphone-based reverberation time estimation using a DNN that may apply, to estimation, relative spatial information between input signals using a multichannel microphone and may estimate a degree of reverberation by modeling a nonlinear distribution of feature vectors capable of excellently representing a reverberation characteristic of space using a DNN, thereby achieving accuracy and a characteristic robust against noise.

Also, according to example embodiment, it is possible to provide information required for an important algorithm, for example, reverberation removal, voice modeling, and voice recognition, easily applicable to devices using a multichannel microphone with a currently increased utilization level, such as a mobile device and an Internet of things (IoT) device.

BEST MODE

Figure 1:
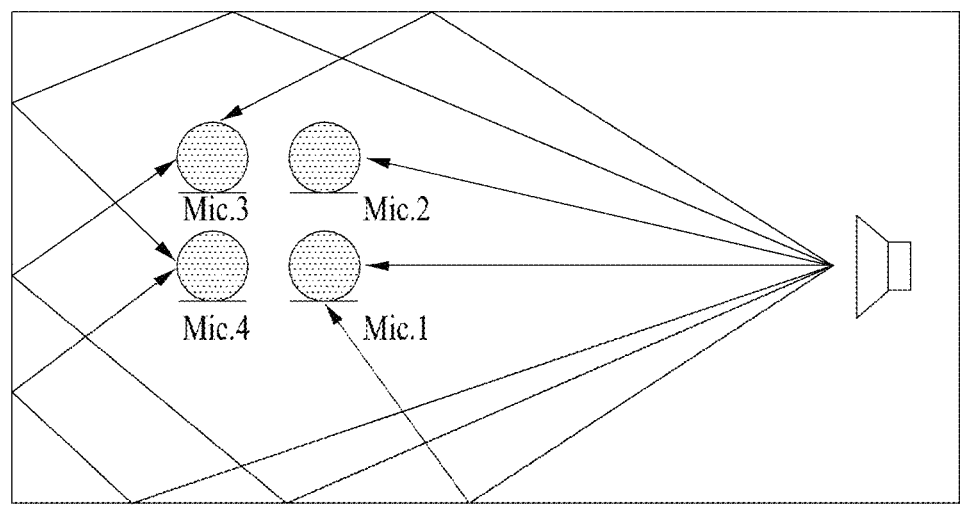
FIG. 1 illustrates an example of a method of inputting a reverberation signal using a multichannel microphone in a reverberation environment according to an example embodiment.

Hereinafter, example embodiments will be described with reference to the accompanying drawings. However, the example embodiments may be variously modified and the scope of the disclosure is not limited to the following example embodiments. Also, some example embodiments are provided to further fully explain the disclosure for one of ordinary skill in the art. Shapes and sizes of components in the drawings may be exaggerated for concise explanation.

The example embodiments relate to estimating everberation in a voice recognition by acquiring relative spatial information from voice signals input through a multichannel microphone and by modeling a nonlinear distribution characteristic through a deep neural network (DNN) that is a depth structure-based machine learning method, in a situation in which spatial information is unknown.

FIG. 1 illustrates an example of a method of inputting a reverberation signal using a multichannel microphone in a reverberation environment according to an example embodiment.

Referring to FIG. 1, a multichannel microphone-based reverberation time estimation method using a DNN relates to technology for estimating a degree of reverberation by deriving a feature vector capable of including spatial information using only a voice signal input through a multichannel microphone and by applying the feature vector to an artificial neural network, in a situation in which the spatial information is unknown.

Reverberation occurring during a propagation process through a space may significantly degrade the accuracy of a voice and acoustic signal processing process, for example, voice recognition, direction estimation, voice modeling, and location estimation. Accordingly, to quantitatively estimate a degree of reverberation is essential in a voice signal processing field.

By receiving voice signals input through the multichannel microphone, relative spatial information between the input voice signals may be estimated.

That is, the multichannel microphone-based reverberation time estimation method using the DNN according to an example embodiment may apply, to estimation, relative spatial information between input signals using the multichannel microphone and may estimate a degree of reverberation by modeling a nonlinear distribution of feature vectors capable of excellently representing a reverberation characteristic of space using the DNN that is a deep structure-based machine learning method.

Also, the example embodiments may provide an estimation method that may outperform an existing reverberation estimation method and may enhance accuracy and robustness against noise using a multichannel microphone used in various environments, such as a mobile device and an Internet of things (IoT) device.

Figure 2:
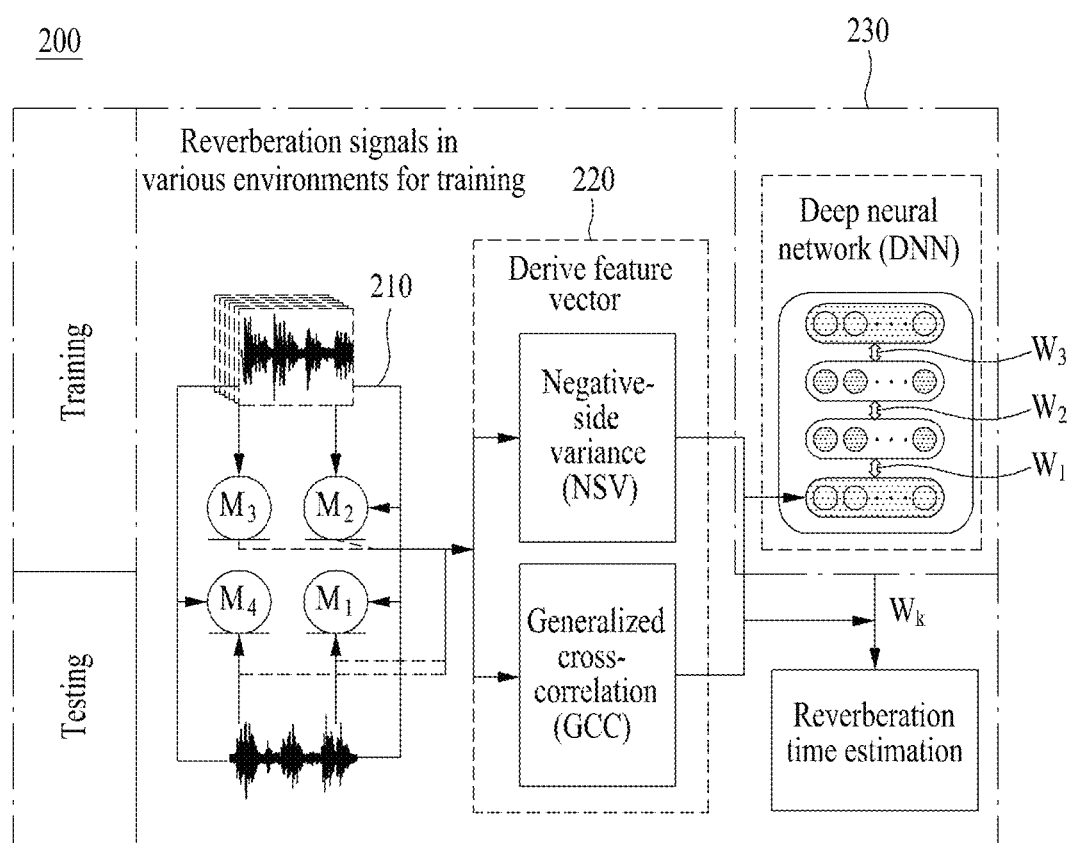
FIG. 2 illustrates an example of a reverberation time estimation algorithm using a multichannel microphone in a reverberation environment according to an example embodiment.

FIG. 2 illustrates an example of a reverberation time estimation algorithm using a multichannel microphone in a reverberation environment according to an example embodiment.

Referring to FIG. 2, a reverberation time estimation algorithm 200 using a multichannel microphone in a reverberation environment according to an example embodiment may estimate a degree of reverberation by deriving a feature vector capable of including spatial information from a voice signal input through a multichannel microphone 210 in operation 220 and by applying the feature vector to an artificial neural network that is a deep neural network (DNN) 230.

In detail, the reverberation time estimation algorithm 200 may derive a cross-correlation function from the voice signal input through the multichannel microphone 210, may derive distribution of envelopes for each frequency band based on time and frequency information that is derived using a short time Fourier transform (STFT) in operation 220, and may input the derived cross-correlation function and distribution of envelopes as a feature vector of the DNN 230.

Here, the DNN 230 is known to have an excellent performance in modeling a complex nonlinear relationship in a large amount of data and thus, may use a cross-correlation function derivable through the multichannel microphone 210 as well as a known relationship between a negative-side distribution, that is, a decay rate distribution, and a reverberation time. Using this, spatial information between microphones may be used to estimate a reverberation time.

Here, a training operation may be performed before a testing operation.

In the training operation, a feature vector may be derived from a voice database (DB) with sufficient capacity including various speakers, sentences, and environments, and a reverberation time may be estimated through the DNN 230.

In the testing operation, feature vectors may be derived from contaminated voice signals by various noise environments and a reverberation time may be estimated by allowing the feature vectors to pass through the pretrained DNN 230.

Through this process, it is possible to simultaneously acquire a relationship between feature vectors underivable through modeling alone and a relationship between reverberation times, which may lead to outperforming the existing methods. Accordingly, it is possible to acquire a relatively high accuracy and a characteristic robust against noise compared to the existing estimation methods.

Hereinafter, a reverberation time estimation algorithm using a multichannel microphone in a reverberation environment according to an example embodiment is further described.

Figure 3:
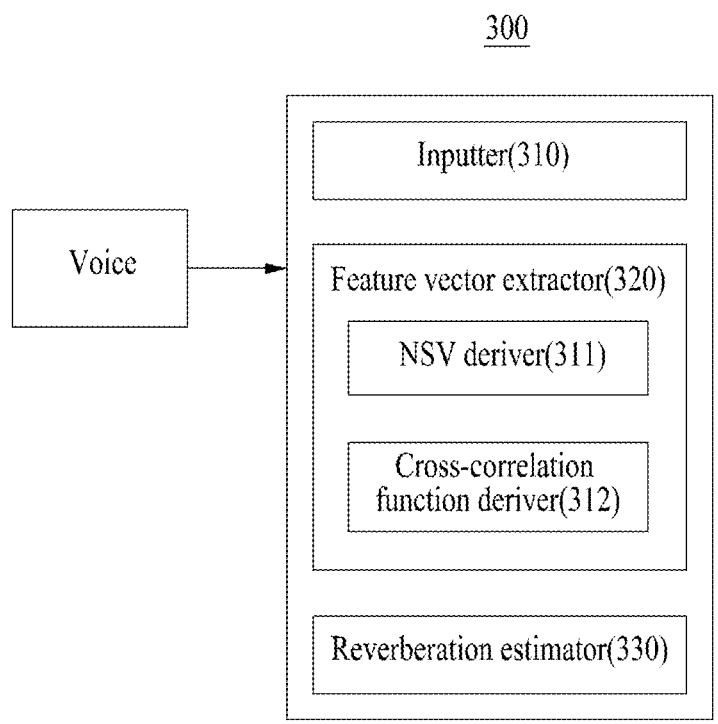
FIG. 3 is a diagram illustrating an example of a multichannel microphone-based reverberation time estimation apparatus using a deep neural network (DNN) according to an example embodiment.

FIG. 3 is a diagram illustrating an example of a multichannel microphone-based reverberation time estimation apparatus using a DNN according to an example embodiment.

Referring to FIG. 3, a multichannel microphone-based reverberation time estimation apparatus 300 using a DNN according to an example embodiment may include an inputter 310, a feature vector extractor 320, and a reverberation estimator 330.

The inputter 310 may receive an input of a voice signal through a multichannel microphone. Here, the voice signal may be a contaminated voice signal, that is, a voice signal that is contaminated due to ambient noise.

The feature vector extractor 320 may extract a feature vector that includes spatial information using the input voice signal.

The feature vector extractor 330 may include a negative-side variance (NSV) deriver 311 and a cross-correlation function deriver 312.

The NSV deriver 311 may derive an NSV by deriving time and frequency information from the voice signal using a short-time Fourier transform (STFT) and by deriving distribution of envelopes for each frequency band based on the derived time and frequency information.

In detail, the NSV deriver 311 may derive a log-energy envelope from an STFT domain, may derive a gradient from the log-energy envelope using a least squares linear fitting, and may derive an NSV for estimating a reverberation time having a negative gradient, excluding a reverberation time having a positive gradient.

The feature vector derived in the aforementioned manner may have a relatively high relationship with the reverberation time compared to a case of observing either a gradient or a negative side that is a decay rate.

The cross-correlation function deriver 312 may derive a cross-correlation function for estimating a direction of voice in the multichannel microphone by representing a correlation between two microphones in voice signals.

To represent a correlation between two signals of microphones that are input through the multichannel microphone, the cross-correlation function deriver 312 may use a cross-correlation function (generalised cross-correlation with phase transform (GCC-PHAT)) value as an input of the DNN using a Fourier transform of the two signals. Here, to use a correlation between reflected sound and direct sound of voice, cross-correlation function (GCC-PHAT) values of a predetermined number of previous and subsequent frames may be used as an input of the DNN.

Such values extracted by the NSV deriver 311 and the cross-correlation function deriver 312 may be used as an input of the DNN of the reverberation estimator 330 to estimate a degree of reverberation.

The reverberation estimator 330 may estimate a degree of reverberation by applying the feature vector to the DNN.

The reverberation estimator 330 may estimate a reverberation time by using the derived NSV as the input of the DNN. Also, the reverberation estimator 330 may estimate the reverberation time by using the value of the cross-correlation function that includes spatial information between microphones as the input of the DNN.

That is, the reverberation estimator 330 may estimate the reverberation time by inputting the NSV to the DNN and may also estimate the reverberation time by estimating spatial information between microphones derived through the multichannel microphone.

The DNN may include three hidden layers, and each of the hidden layers may be finely adjusted through a pre-training process using a plurality of epochs.

In detail, the DNN may include three hidden layers and 1500 nodes. Each hidden layer may go through the pre-training process using 50 epochs and may be finely adjusted using 500 epochs.

Accordingly, there may be provided a multichannel microphone-based reverberation time estimation apparatus using a DNN having a relatively high accuracy and characteristic robust against noise.

The multichannel microphone-based reverberation time estimation apparatus 300 using the DNN according to an example embodiment may be applicable to a multichannel microphone in a concentrated structure in which spatial aliasing between microphones is considered and may also be applicable to a miniaturized device.

Figure 4:
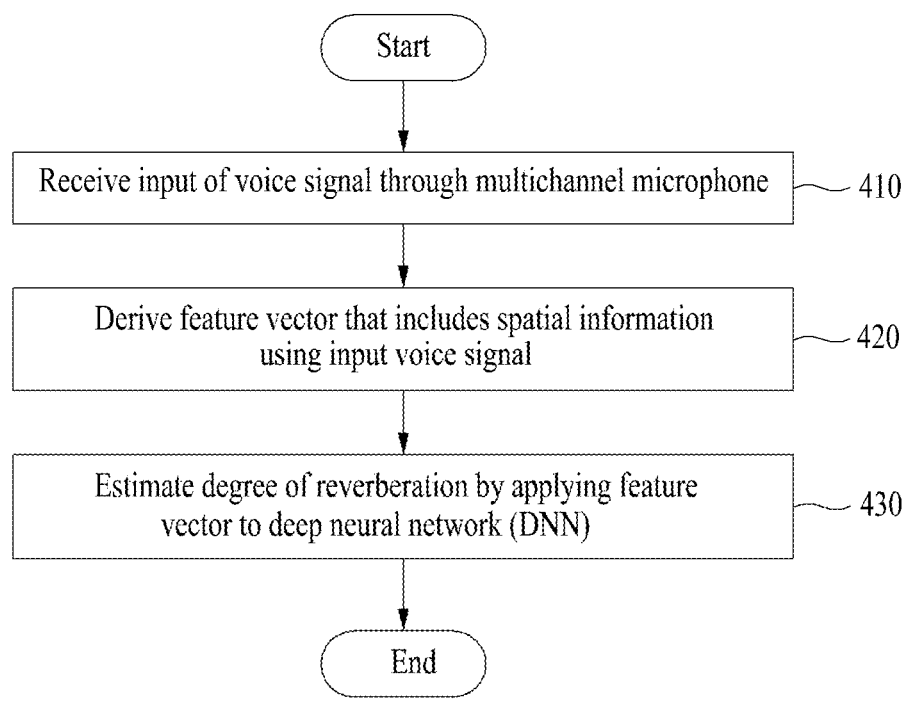
FIG. 4 is a flowchart illustrating an example of a multichannel microphone-based reverberation time estimation method using a DNN according to an example embodiment.

FIG. 4 is a flowchart illustrating an example of a multichannel microphone-based reverberation time estimation method using a DNN according to an example embodiment.

Referring to FIG. 4, a multichannel microphone-based reverberation time estimation method using a DNN according to an example embodiment may include operation 410 of receiving an input of a voice signal through a multichannel microphone; operation 420 of deriving a feature vector that includes spatial information using the input voice signal; and operation 430 of estimating a degree of reverberation by applying the feature vector to the DNN.

Here, operation 420 of deriving the feature vector that includes the spatial information using the input voice signal may include deriving an NSV by deriving time and frequency information from the input voice signal using an STFT and by deriving distribution of envelopes for each frequency band based on the derived time and frequency information.

Also, operation 420 of deriving the feature vector that includes the spatial information using the input voice signal may include deriving a cross-correlation function for estimating a direction of voice in the multichannel microphone by representing a correlation between two microphones in the input voice signal.

Hereinafter, the multichannel microphone-based reverberation time estimation method using the DNN will be further described using an example.

The multichannel microphone-based reverberation time estimation method using the DNN according to an example embodiment may be further described using the multichannel microphone-based reverberation time estimation apparatus using the DNN of FIG. 3. Here, the multichannel microphone-based reverberation time estimation apparatus using the DNN may include an inputter, a feature vector extractor, and a reverberation estimator.

In operation 410, the inputter may receive an input of a voice signal through a multichannel microphone. Accordingly, relative spatial information between voice signals input using the multichannel microphone may be estimated.

In operation 420, the feature vector extractor may extract a feature vector that includes spatial information using the input voice signal.

The feature vector extractor may include an NSV deriver and a cross-correlation function deriver.

The NSV deriver included in the feature vector extractor may derive an NSV by deriving time and frequency information from the input voice signal using an STFT and by deriving distribution of envelopes for each frequency band based on the derived time and frequency information.

In detail, the NSV deriver may derive the NSV from the input voice signal through operations of deriving a log-energy envelope from an STFT domain, deriving a gradient from the log-energy envelope using a least squares linear fitting, and deriving an NSV for estimating a reverberation having a negative gradient, excluding a reverberation time having a positive gradient.

An operation of estimating the degree of reverberation by applying the feature vector to the DNN may estimate a reverberation time by using the derived NSV as an input of the DNN.

The cross-correlation function deriver may derive a cross-correlation function of estimating a direction of voice in the multichannel microphone by representing a correlation between two microphones in the voice signal.

In operation 430, the reverberation estimator may estimate a degree of reverberation by applying the feature vector to the DNN.

The reverberation estimator may estimate a reverberation time by using the derived NSV as an input of the DNN and, at the same time, may estimate spatial information between microphones by using a value of the cross-correlation function derived through the multichannel microphone as an input of the DNN.

Here, the DNN may include three hidden layers, and each of the hidden layers may be finely adjusted through a pre-training process using a plurality of epochs.

Hereinafter, a method of deriving a feature vector will be further described.

An NSV and a cross-correlation function (GCC-PHAT or GCC) may be used for the feature vector.

The NSV deriver may derive a log-energy envelope from an STFT domain, may derive a gradient from the log-energy envelope using a least squares linear fitting, and may derive an NSV for estimating a reverberation having a negative gradient, excluding a reverberation time having a positive gradient.

The feature vector extracted in the aforementioned manner may have a relatively high relationship with the reverberation time compared to a case of observing either a gradient or a negative side. The above features may be verified through the following experimental results.

Figure 5:
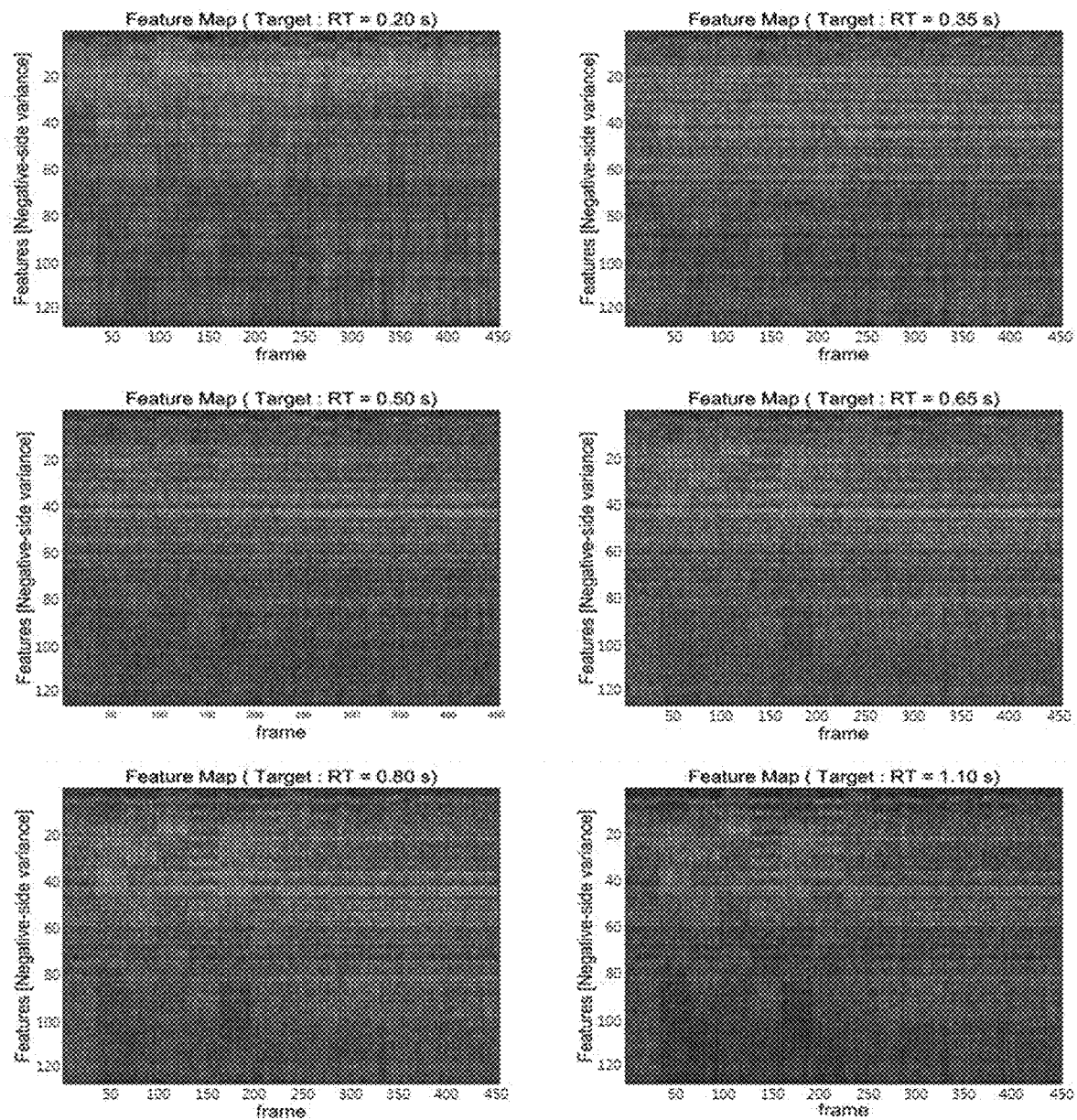
FIG. 5 illustrates examples of describing a negative-side variance (NSV) through a spectrum according to an example embodiment.

FIG. 5 illustrates examples of describing features of an NSV through a spectrum according to an example embodiment.

Referring to FIG. 5, there are shown features of an NSV among feature vectors through spectrums acquired from experiments of applying a multichannel microphone-based reverberation time estimation method using a DNN according to an example embodiment. Here, features of NSV may be verified through spectrums on $T_{60}$=0.20, 0.35, 0.50, 0.65, 0.80, and 1.10 s.

Here, as for numerical values used for the experiments, a sampling rate is 8,000 hertz (Hz), a size of Hamming window used for observation in an STFT domain is 256, fast Fourier transform (FFT) size is 28, and a least squares linear fitting derives a gradient by using 30 sequential frames in the STFT domain, which may be derived in an overlapped state by each 25%.

The cross-correlation function (GCC-PHAT or GCC) is a feature vector that is frequently used to estimate a direction of voice in a multichannel microphone as an index representing a correlation between two signals.

When two signals $x_1(n)$ and $x_2(n)$ are defined, the cross-correlation function (GCC-PHAT) may be represented as the following equation.

$$G_{PHAT}(f) = X_1(g)[X_2(f)^*]/|X_1(f)[X_2(f)^*]| \quad \text{[Equation 1]}$$

In Equation 1, $X_1(f)$ and $X_2(f)$ denote Fourier transform of the respective corresponding two signals and [ ]* denotes a complex conjugate.

When applying inverse Fourier transform to $G_{PHAT}(f)$, $R_{PHAT}(d)$ including cross-correlation information may be derived. In general use of the feature vector, only an index of a maximum value may be extracted from $R_{PHAT}(d)$ derived for direction estimation and may be applied to equation.

Here, to use a correlation between reflected sound and direct sound of voice, cross-correlation function (GCC-PHAT) values of a total of 21 frames including previous and subsequent each 10 frames may be used as an input of the DNN.

Also, the feature vector may be derived using the same sync to the NSV. That is, a size of Hamming window is 256, an FFT size is 128, and deriving may be performed in an overlapped state by each 25%.

Figure 6:
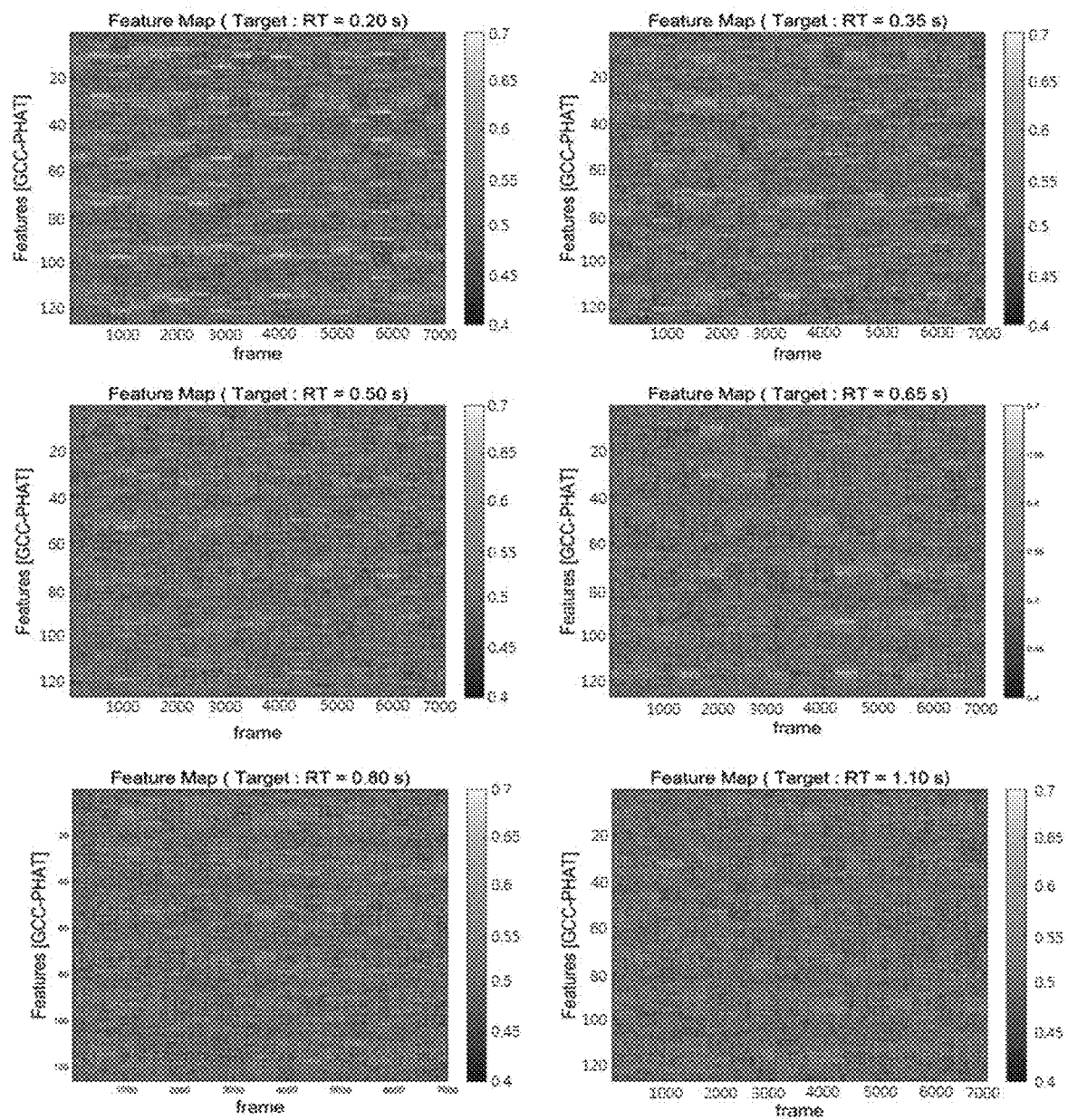
FIG. 6 illustrates examples of describing features of a cross-correlation function through a spectrum according to an example embodiment.

FIG. 6 illustrates examples of describing features of a cross-correlation function through a spectrum according to an example embodiment.

Referring to FIG. 6, there are shown features of a cross-correlation function (GCC-PHAT) among feature vectors through spectrums acquired from experiments of applying a multichannel microphone-based reverberation time estimation method using a DNN according to an example embodiment. Here, features of the cross-correlation function (GCC-PHAT) may be verified through spectrums on $T_{60}$=0.20, 0.35, 0.50, 0.65, 0.80, and 1.10 s.

A feature vector may be derived using a voice database (DB) with sufficient capacity including various speakers, sentences, and environments, and the NSV may include 127 feature vectors for each of four channels (4×127=508) and the cross-correlation function (GCC-PHAT) may include 21 feature vectors for a number of microphone pairs available using four microphones (3!) (6×21=126). Accordingly, an input vector may have a total of 634 dimensions.

For example, the DNN may include three hidden layers and 1500 nodes. Each hidden layer may go through the pre-training process using 50 epochs and may be finely adjusted using 500 epochs.

The above numerical values may be derived within the range in which it is possible to prevent over-training of input data and it is possible to excellently represent a characteristic of a reverberation time through an experimental process.

Figure 7:
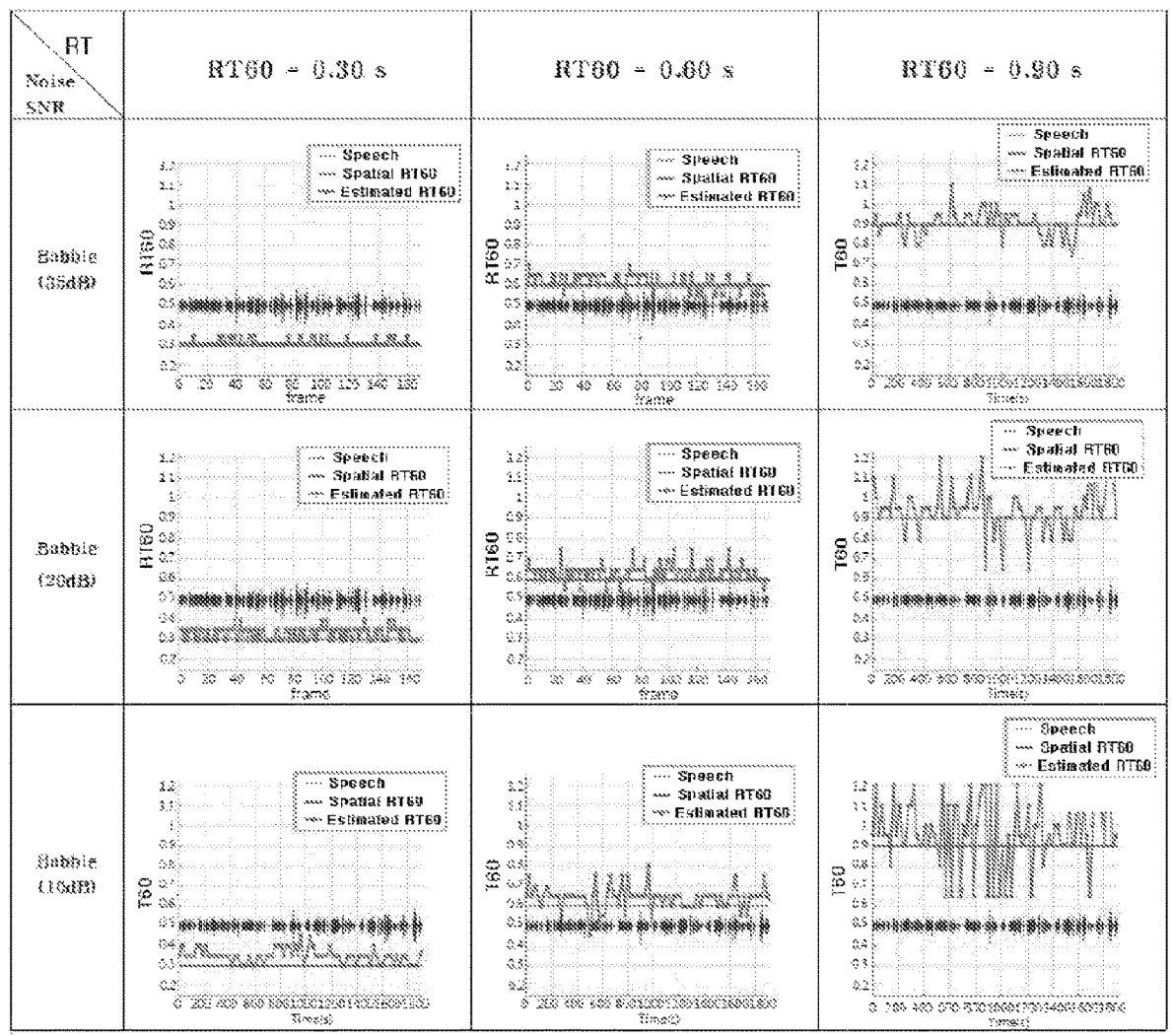
FIG. 7 shows an example of reverberation time estimation using a multichannel microphone in a reverberation environment according to an example embodiment.

FIG. 7 shows an example of reverberation time estimation using a multichannel microphone in a reverberation environment according to an example embodiment.

Referring to FIG. 7, it is possible to estimate a reverberation time of voice including unlearned reverberation in various noise environments.

Compared to existing methods, a relatively high performance is acquired in poor reverberation environments and noise environments.

Table 1 shows a comparison of performance between the existing art and the proposed reverberation time estimation using the multichannel microphone in the reverberation environment.

TABLE 2

| | Algorithm | | | | | | | | |
|---|---|---|---|---|---|---|---|---|---|
| | ML | | | SDDSA-G | | | DNN-MCF | | |
| Noise type | Bias | MSE | ρ | Bias | MSE | ρ | Bias | MSE | ρ |
| Airport | −0.1680 | 0.0467 | 0.9277 | 0.1013 | 0.0327 | 0.8722 | −0.1363 | 0.0314 | 0.9659 |
| Babble | −0.1688 | 0.0486 | 0.9218 | 0.0943 | 0.0319 | 0.8674 | −0.1192 | 0.0261 | 0.9685 |
| Exhibition | −0.1758 | 0.0524 | 0.9167 | 0.0966 | 0.0328 | 0.8660 | −0.0851 | 0.0179 | 0.9703 |
| Factory | −0.2961 | 0.1286 | 0.8031 | 0.0078 | 0.0331 | 0.8057 | 0.0020 | 0.0112 | 0.0540 |
| Restaurant | −0.1731 | 0.0512 | 0.9171 | 0.1095 | 0.0369 | 0.8561 | −0.1195 | 0.0269 | 0.9669 |
| Street | −0.1604 | 0.0441 | 0.9284 | 0.1229 | 0.0401 | 0.8548 | −0.1170 | 0.0256 | 0.9671 |

Referring to Table 1, the comparison of performance between the existing art and the proposed reverberation time estimation using the multichannel microphone in the reverberation environment is shown. Here, a signal-to-noise ratio (SNR) is 35 dB.

Table 2 shows a comparison of performance between the existing art and the proposed reverberation time estimation using the multichannel microphone in the reverberation environment.

TABLE 3

| | Algorithm | | | | | | | | |
|---|---|---|---|---|---|---|---|---|---|
| | ML | | | SDDSA-G | | | DNN-MCF | | |
| Noise type | Bias | MSE | ρ | Bias | MSE | ρ | Bias | MSE | ρ |
| Airport | −0.3484 | 0.1948 | 0.6338 | −0.1393 | 0.0444 | 0.8537 | 0.0872 | 0.0314 | 0.9707 |
| Babble | −0.3793 | 0.2258 | 0.5710 | −0.1747 | 0.0602 | 0.8233 | 0.0893 | 0.0145 | 0.9700 |
| Exhibition | −0.3829 | 0.2268 | 0.5724 | −0.1763 | 0.0683 | 0.7700 | 0.2158 | 0.0811 | 0.8127 |
| Factory | −0.3115 | 0.1527 | 0.7408 | −0.0994 | 0.0383 | 0.8282 | 0.1515 | 0.0351 | 0.9320 |
| Restaurant | −0.3714 | 0.2164 | 0.5945 | −0.1524 | 0.0498 | 0.8456 | 0.0594 | 0.0115 | 0.9680 |
| Street | −0.2851 | 0.1306 | 0.7736 | −0.1108 | 0.0397 | 0.8372 | 0.1022 | 0.0200 | 0.9525 |

Referring to Table 2, the comparison of performance between the existing art and the proposed reverberation time estimation using the multichannel microphone in the reverberation environment is shown. Here, an SNR is 10 dB.

For example, a reverberation time of voice that includes reverberation including English and Korean of about 30 minutes is estimated in various noise environments.

As for performance evaluation, a bias, a mean square error (MSE), and a Pearson correlation coefficient (p) according to each condition may be derived and used for comparison.

Here, the bias represents a mean error for an expected value to a true value, the MSE represents the average of squares of errors, and the Pearson correlation coefficient represents a correlation between a true value and an expected value and may indicate that the performance is excellent as it gets closer to 1.

According to example embodiments, there may be provided a multichannel microphone-based reverberation time estimation method and apparatus using a DNN that may acquire a relatively high accuracy and characteristic robust against noise compared to the existing estimation methods.

The existing multichannel-based estimation techniques are not in a structure applicable to a miniaturized IoT device. According to example embodiments, there may be provided a multichannel microphone-based reverberation time estimation method and apparatus using a DNN that may be applicable to a multichannel microphone in a concentrated structure in which spatial aliasing between microphones is considered and may also be applicable to a miniaturized device.

Accordingly, it is possible to provide information required for an important algorithm, for example, reverberation removal, voice modeling, and voice recognition, easily applicable to devices using a multichannel microphone with a currently increased utilization level, such as a mobile device and an IoT device. Also, it is possible to increase a voice recognition rate in a poor environment due to noise and reverberation.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The methods according to the above-described example embodiments may be recorded in non-transitory computer-readable storage media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable storage media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:
1. A method for multichannel microphone-based reverberation time estimation using a deep neural network (DNN), the method comprising:
  receiving an input of a voice signal through a multichannel microphone;
  deriving a feature vector that includes spatial information using the input voice signal, and
  estimating a degree of reverberation by applying the feature vector to the DNN,
  wherein the deriving of the feature vector comprises:
    deriving a negative-side variance (NSV) by deriving time and frequency information from the input voice signal using a short-time Fourier transform (STFT) and by deriving distribution of envelopes for each frequency band based on the derived time and frequency information; and
    deriving a cross-correlation function representing a correlation between two microphones in the input voice signal, and wherein the estimating of the degree of reverberation comprises estimating a reverberation time by using the derived NSV and the cross-correlation function as an input of the DNN.

2. The method of claim 1, wherein the receiving of the voice signal through the multichannel microphone comprises estimating relative spatial information between voice signals input using the multichannel microphone.

3. The method of claim 1, wherein the deriving of the NSV comprises:
  deriving a log-energy envelope from a domain of the STFT;
  deriving a gradient from the log-energy envelope using a least squares linear fitting; and
  deriving an NSV for estimating a reverberation time having a negative gradient, excluding a reverberation time having a positive gradient.

4. The method of claim 1, wherein the estimating of the degree of reverberation by applying the feature vector to the DNN comprises estimating a reverberation time by using the derived NSV as an input of the DNN.

5. The method of claim 1, wherein the DNN comprises three hidden layers, and each of the hidden layers is configured to be finely adjusted through a pre-training process using a plurality of epochs.

6. An apparatus for multichannel microphone-based reverberation time estimation using a deep neural network (DNN), the apparatus comprising:
  an inputter configured to receive an input of a voice signal through a multichannel microphone;
  a feature vector extractor configured to derive a feature vector that includes spatial information using the input voice signal; and
  a reverberation estimator configured to estimate a degree of reverberation by applying the feature vector to the DNN,
wherein the feature vector extractor comprises:
  a negative-side variance (NSV) deriver configured to derive an NSV by deriving time and frequency information from the input voice signal using a short-time Fourier transform (STFT) and by deriving distribution of envelopes for each frequency band based on the derived time and frequency information; and
  a cross-correlation function deriver configured to derive a cross-correlation function representing a correlation between two microphones in the input voice signal, and
wherein the reverberation estimator is configured to estimate a reverberation time by using the derived NSV the cross-correlation function as an input of the DNN.

7. The apparatus of claim 6, wherein the NSV deriver is configured to derive a log-energy envelope from a domain of the STFT, to derive a gradient from the log-energy envelope using a least squares linear fitting, and to derive an NSV for estimating a reverberation having a negative gradient, excluding a reverberation time having a positive gradient.

8. The apparatus of claim 6, wherein the reverberation estimator is configured to estimate a reverberation time by using the derived NSV as an input of the DNN.

9. The apparatus of claim 6, wherein the DNN comprises three hidden layers, and each of the hidden layers is configured to be finely adjusted through a pre-training process using a plurality of epochs.

* * * * *